US012050001B2

(12) United States Patent
Stucchi

(10) Patent No.: US 12,050,001 B2
(45) Date of Patent: Jul. 30, 2024

(54) CONNECTION DEVICE ADAPTED FOR DIFFERENT ELECTRIFIED GUIDES

(71) Applicant: A.A.G. Stucchi S.r.l., Olginate (IT)

(72) Inventor: Aristide Stucchi, Lecco (IT)

(73) Assignee: A.A.G. STUCCHI S.R.L., Olginate (IT)

( * ) Notice: Subject to any disclaimer, the term of this patent is extended or adjusted under 35 U.S.C. 154(b) by 0 days.

(21) Appl. No.: 17/783,742

(22) PCT Filed: Dec. 9, 2020

(86) PCT No.: PCT/IB2020/061686

§ 371 (c)(1),
(2) Date: Jun. 9, 2022

(87) PCT Pub. No.: WO2021/116930

PCT Pub. Date: Jun. 17, 2021

(65) Prior Publication Data

US 2023/0045049 A1 Feb. 9, 2023

(30) Foreign Application Priority Data

Dec. 11, 2019 (IT) ........................ 102019000023628

(51) Int. Cl.
*F21V 21/35* (2006.01)
*F21V 23/06* (2006.01)
(Continued)

(52) U.S. Cl.
CPC .............. *F21V 21/35* (2013.01); *F21V 23/06* (2013.01); *H01R 13/15* (2013.01); *H01R 13/20* (2013.01); *H01R 13/64* (2013.01)

(58) Field of Classification Search
CPC ......... F21V 21/35; F21V 23/06; H01R 13/15; H01R 13/20; H01R 13/64
See application file for complete search history.

(56) References Cited

U.S. PATENT DOCUMENTS 4,029,378 A 6/1977 Bollis
2016/0359283 A1* 12/2016 Stucchi .................. F21V 23/02
2019/0170334 A1* 6/2019 Stucchi .................. F21S 8/038

FOREIGN PATENT DOCUMENTS

DE 202012004156 U1 7/2012
EP 3128223 A1 * 2/2017
(Continued)

OTHER PUBLICATIONS

Bidet, Sébastien, "International Search Report and Written Opinion of the International Searching Authority for PCT Application No. PCT/IB2020/061686," European Patent Office, Rijswijk, Netherlands, Mar. 22, 2021.

*Primary Examiner* — Mary Ellen Bowman
(74) *Attorney, Agent, or Firm* — Florek & Endres PLLC

(57) ABSTRACT

The connection device (100) is used for an electrified guide (200) lighting system; the electrified guide (200) is provided with a longitudinal groove (210) and the connection device (100) is adapted to be completely inserted into the electrified guide (200); the connection device (100) comprises at least one mechanical contact device (110, 120) adapted to abut against a bottom surface (212) of said longitudinal groove (210) when the connection device (100) is inserted into the electrified guide (200); the mechanical contact device (110, 120) can be removed or moved so that the connection device (100) can be adapted to electrified guides having longitudinal grooves of different depth; the mechanical contact device (110, 21) is shaped and/or located so that it abuts differently depending on the sense of insertion of the connection device into the electrified guide (10-1, 10-3) so that to avoid insertions in the wrong sense.

15 Claims, 14 Drawing Sheets

Figure 2:
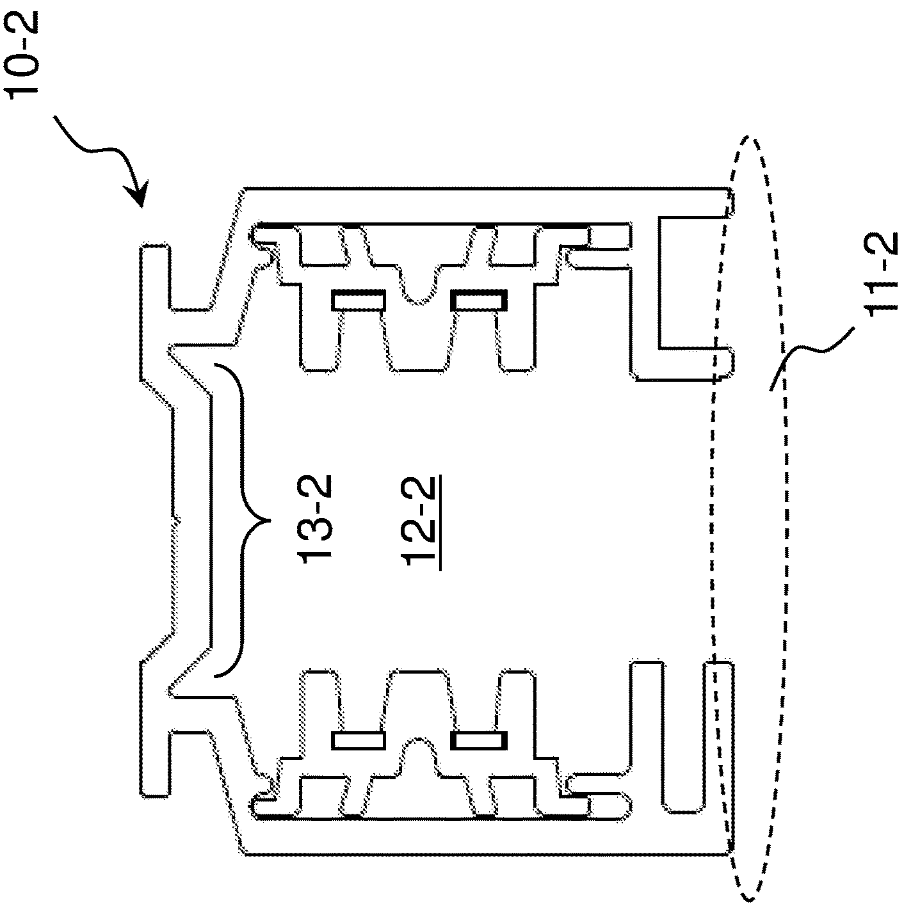

(51) Int. Cl.
*H01R 13/15* (2006.01)
*H01R 13/20* (2006.01)
*H01R 13/64* (2006.01)

(56) References Cited

FOREIGN PATENT DOCUMENTS

| | | | | | |
|---|---|---|---|---|---|
| EP | 3128223 | A1 | | 2/2017 | |
| EP | 3217090 | A1 | * | 9/2017 | .............. F21S 8/038 |
| FR | 1520959 | A | | 4/1968 | |

* cited by examiner

CONNECTION DEVICE ADAPTED FOR DIFFERENT ELECTRIFIED GUIDES

FIELD OF THE INVENTION

The present invention relates to a connection device suitable for different electrified guides.

STATE OF THE ART

Electrified guides have been used for years in the lighting industry.

As is known, an electrified guide has a longitudinal groove into which a connection device, often called an "adapter", is inserted. The electrified guide comprises electrical conductors that extend in the longitudinal direction and that are located at the surface of the groove. The connection device comprises electrical contacts on its external surface; in some types of devices, these contacts can be extracted out and retracted. In use, the electrical contacts of the connection device are in contact with the electrical conductors of the guide.

There are guides of different sizes and grooves of different sizes, too.

In case of electrified guides for three-phase power supply, it can be said that there is de facto a standard, in the sense that there are many guides on the market from different manufacturers having the width of the groove (or rather the widths of the groove have values that are not identical, but very close) and the position of the electrical conductors with respect to the front of the guide in common, but they do not have in common the depth of the groove and they do not have in common the configuration (in cross section) of the groove. For example, the figures from FIG. 1 to FIG. 4 show schematic sectional views of four different electrified guides 10-1, 10-2, 10-3, 10-4 for three-phase power supply available on the market.

SUMMARY

The general object of the present invention is to provide a connection device (for example the one indicated with 20 in the figures from FIG. 5 to FIG. 8) able to adapt to different guides (for example those indicated with 10-1, 10-2, 10-3, 10-4 in the figures from FIG. 1 to FIG. 4 and from FIG. 5 to FIG. 8), but which is also (but not necessarily) suitable for being completely inserted into the electrified guide.

Since, at least in some cases, no part of the connection device (for example the one indicated with 20 in the figures) projects from the guide, the front surface (for example the one indicated with 11-1, 11-2, 11-3, 11-4 in the figures from FIG. 1 to FIG. 4) of the guide cannot be used as a reference for determining the level of insertion of the connection device (for example the one indicated with 20 in the figures) into the groove (for example the one indicated with 12-1, 12-2, 12-3, 12-4 in the figures from FIG. 1 to FIG. 4).

A further problem in relation to electrified guides for three-phase power supply is that the direction of insertion of the connection device into the electrified guide is important as the electrical conductors are not interchangeable, in particular the conductor carrying the phase cannot be exchanged with the conductor carrying the neutral. An incorrect electrical connection between the conductors of the guide and the contacts of the connection device might cause damages to the connection device and/or to electrical utilities connected to the connection device.

This general object as well as other specific objects are achieved thanks to the connection device having the characteristics of the attached claims which are to be considered an integral part of the present description.

Figure 6:
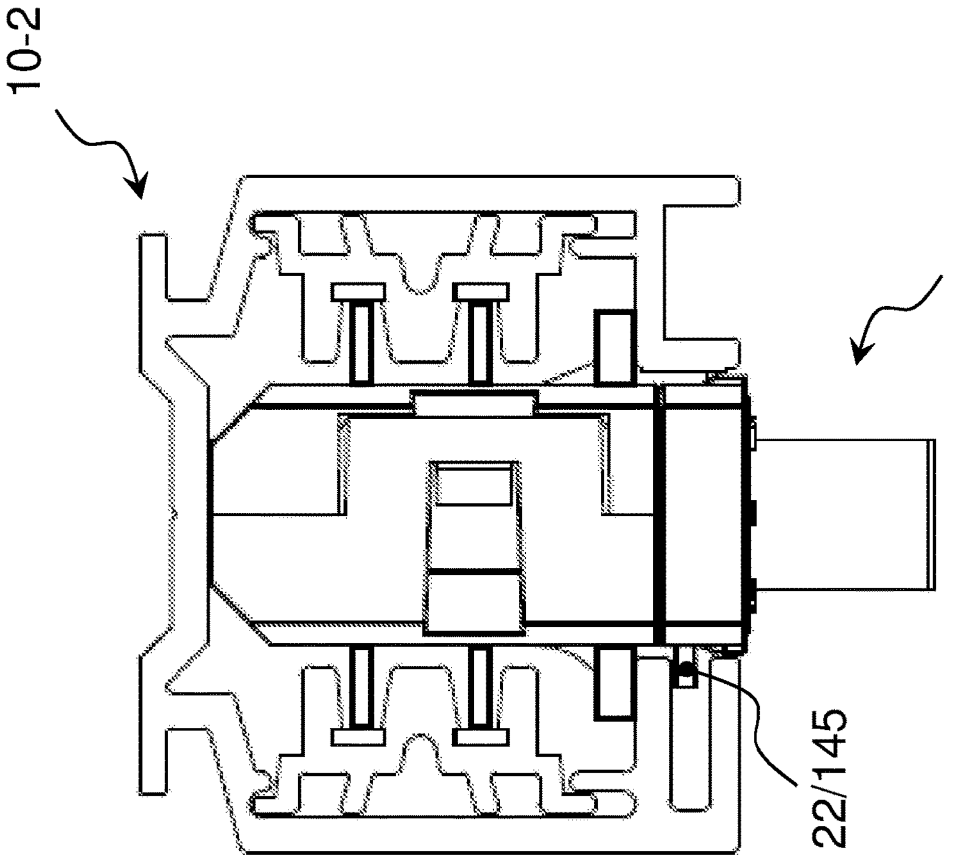
Figure 8:
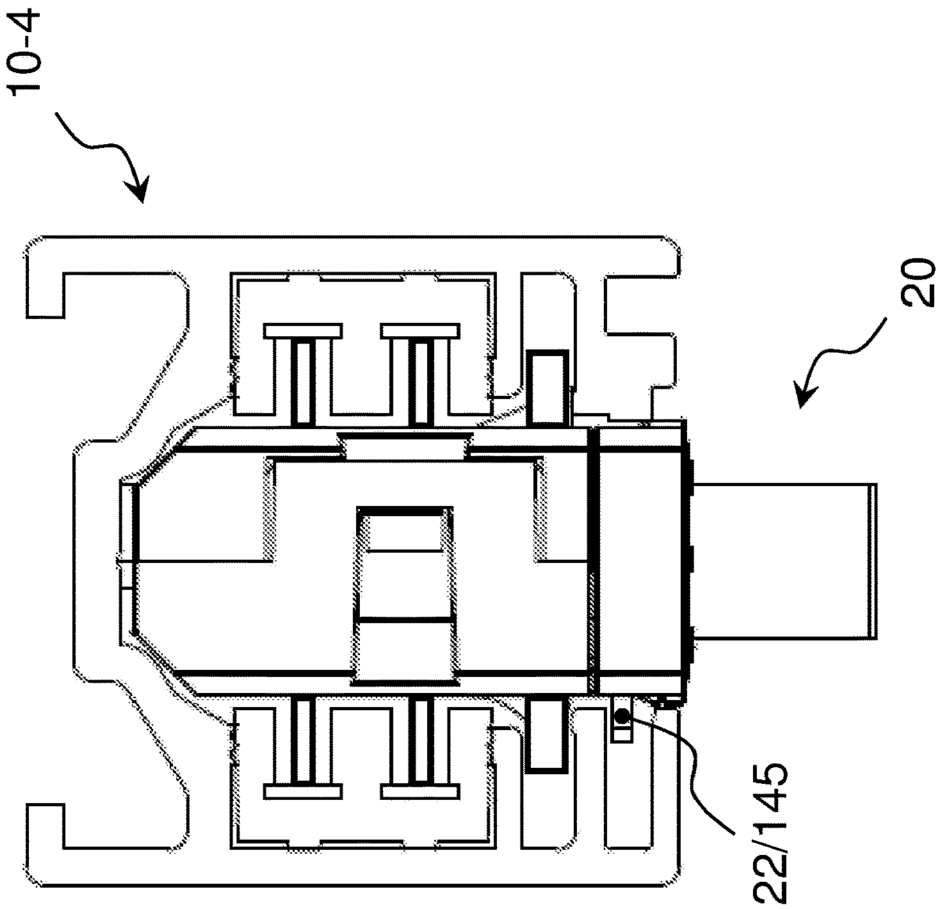

The idea behind the present invention is to use a bottom surface (for example the one indicated with 13-1, 13-2, 13-3, 13-4 in the figures from FIG. 1 to FIG. 4) of the groove (for example the one indicated with 12-1, 12-2, 12-3, 12-4 in the figures from FIG. 1 to FIG. 4) of the guide as a reference for determining the level of insertion of the connection device (for example the one indicated with 20 in the figures) into the guide (for example those indicated with 10-1, 10-2, 10-3, 10-4 in the figures). Furthermore, for adapting to different depths of the guides, a mechanical contact device is provided (not shown in the figures from FIG. 1 to FIG. 4, but shown in a project condition by way of example in FIG. 5 and in FIG. 7 and indicated with 21) that can be removed or moved adapted to abut against said bottom surface; it should be noted that in some operating conditions, it is the casing of the connection device that abuts against said bottom surface (as shown in FIG. 6 and FIG. 8). The present invention also relates to a lighting device comprising such a connection device.

LIST OF FIGURES

Figure 1:
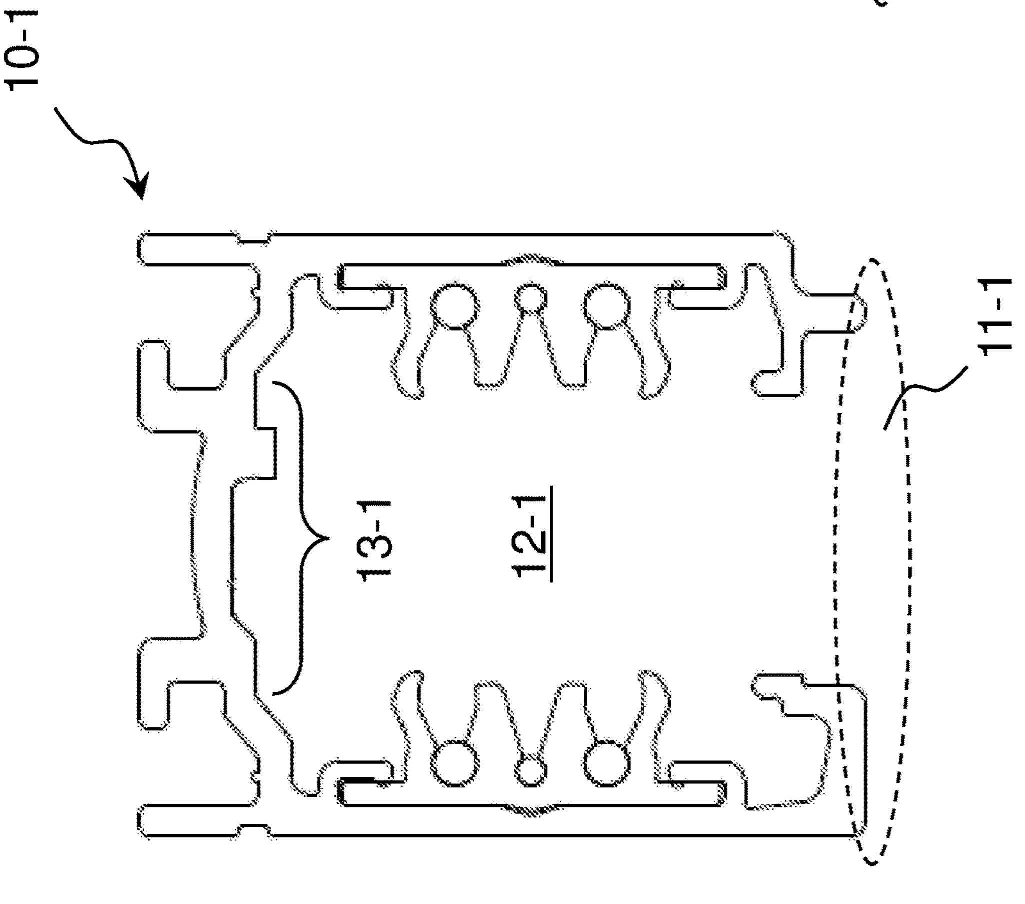
Figure 4:
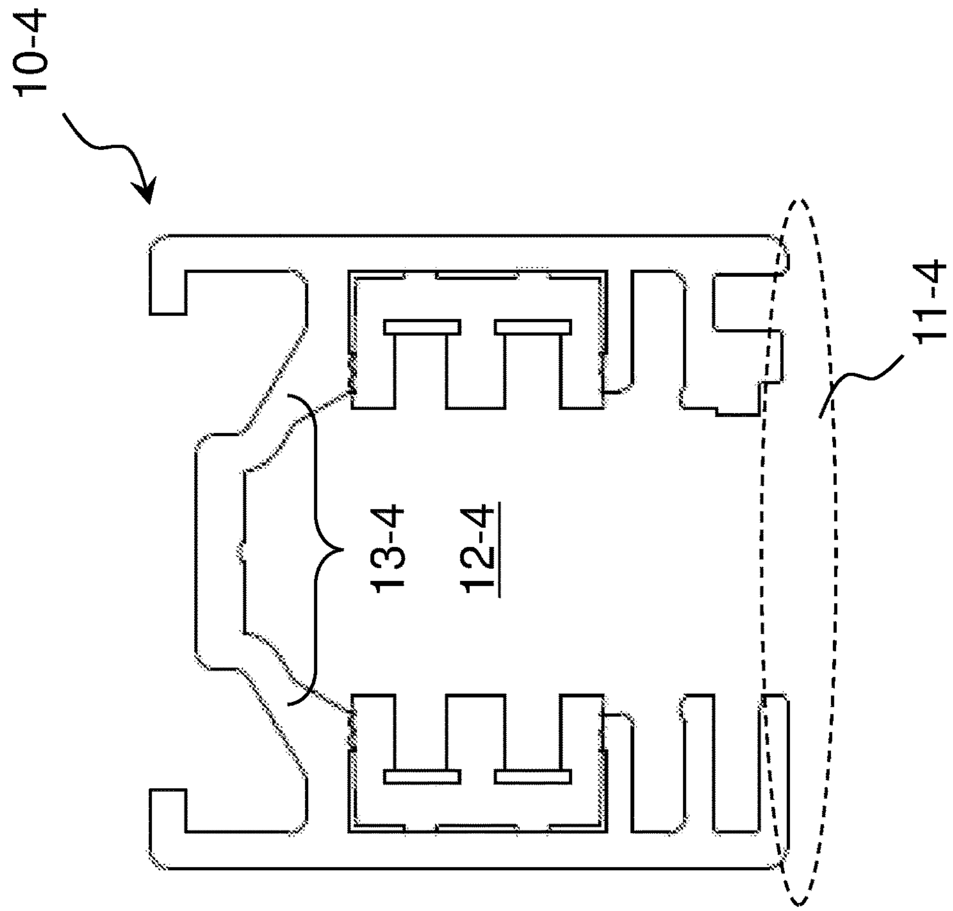
Figure 3:
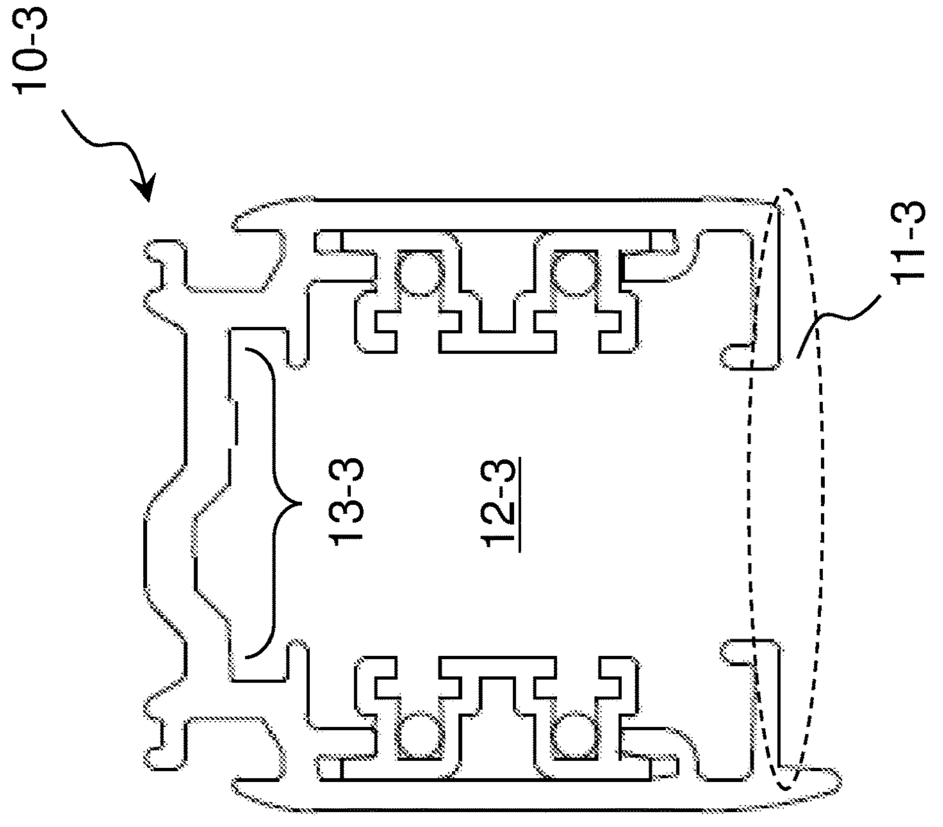
Figure 5:
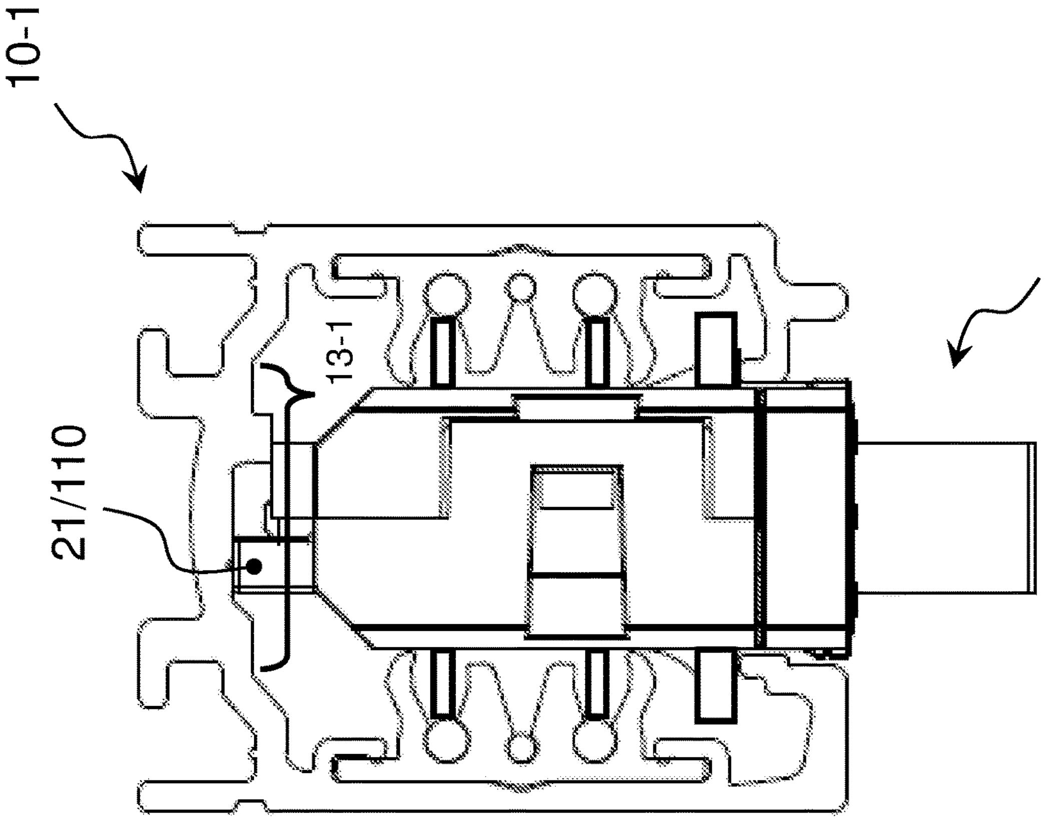
Figure 7:
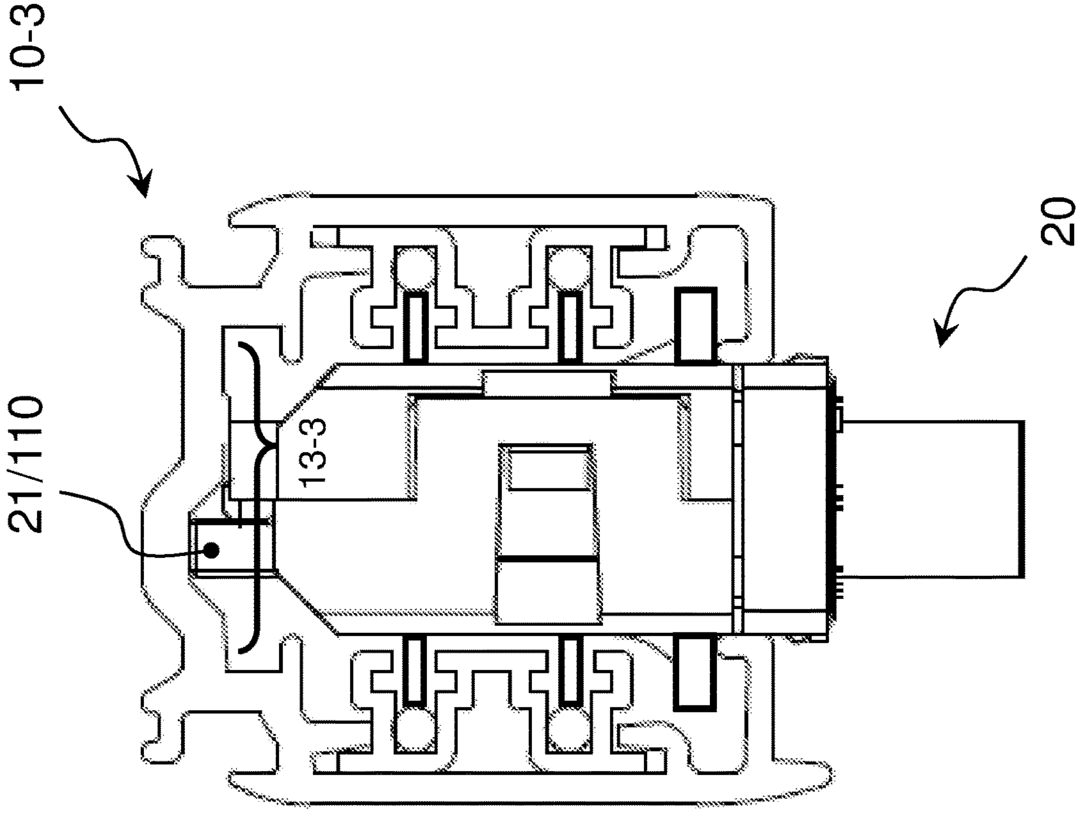
Figure 10:
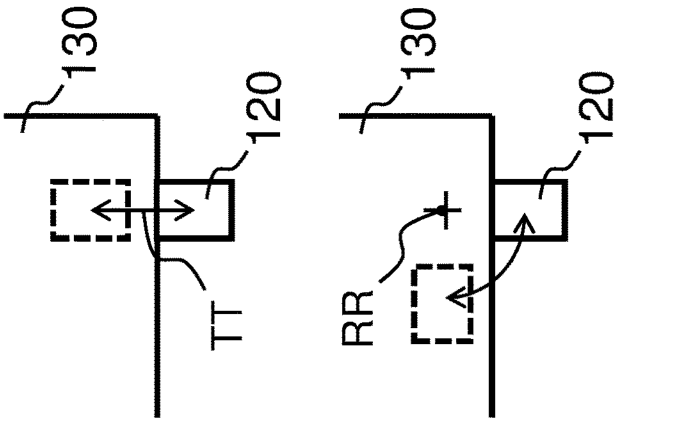
Figure 9:
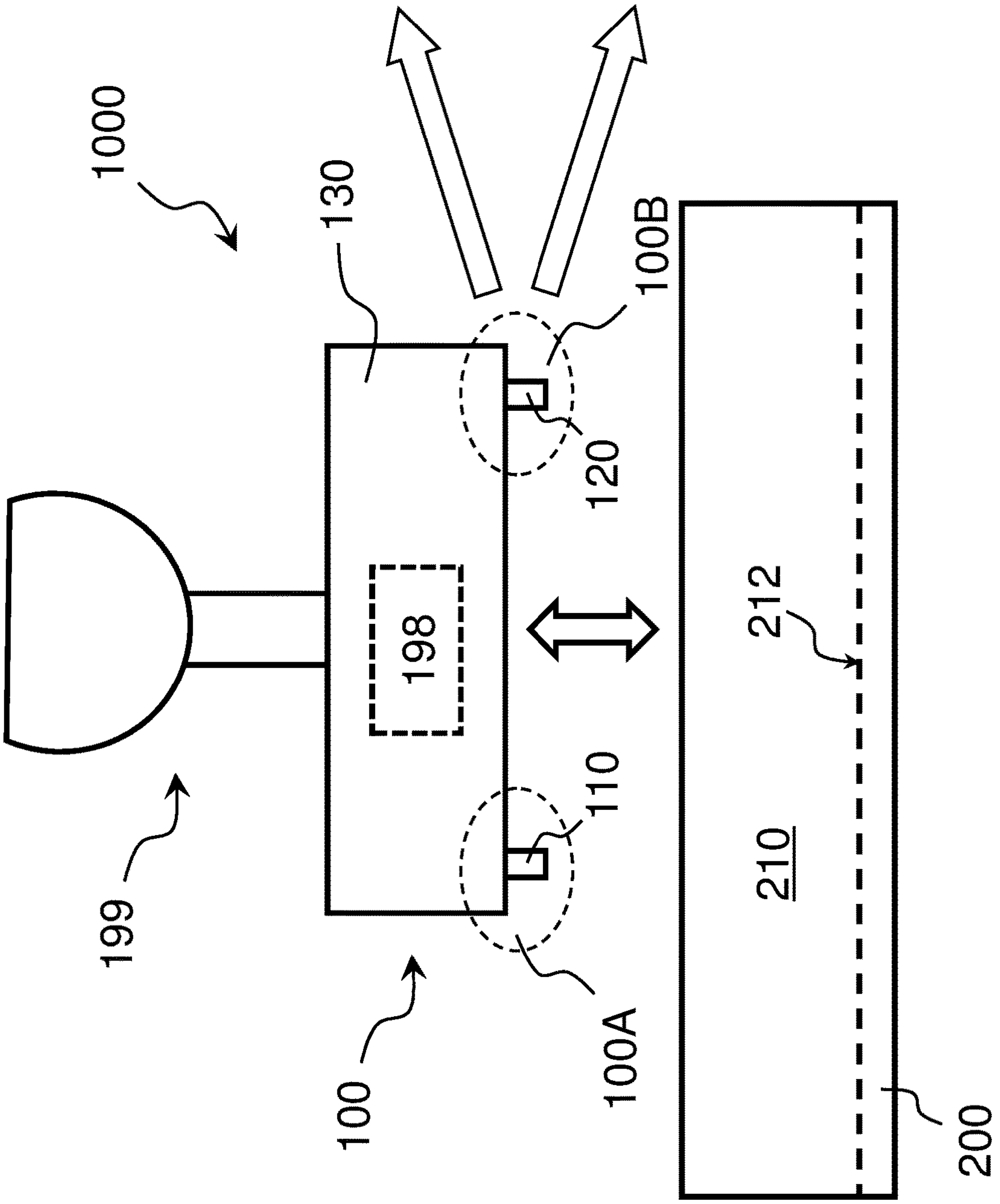

The present invention shall become more readily apparent from the following detailed description to be considered together with the accompanying drawings in which:

FIG. 1 shows a schematic sectional view of a first electrified guide into which an example of embodiment of a connection device according to the present invention can be inserted, FIG. 2 shows a schematic sectional view of a second electrified guide into which an example of embodiment of a connection device according to the present invention can be inserted, FIG. 3 shows a schematic sectional view of a third electrified guide into which an example of embodiment of a connection device according to the present invention can be inserted, FIG. 4 shows a schematic sectional view of a fourth electrified guide into which an example of embodiment of a connection device according to the present invention can be inserted, FIG. 5 shows a schematic sectional view of the electrified guide of FIG. 1 into which a connection device according to the present invention is inserted, FIG. 6 shows a schematic sectional view of the electrified guide of FIG. 2 into which a connection device according to the present invention is inserted, FIG. 7 shows a schematic sectional view of the electrified guide of FIG. 3 into which a connection device according to the present invention is inserted, FIG. 8 shows a schematic sectional view of the electrified guide of FIG. 4 into which a connection device according to the present invention is inserted, FIG. 9 shows a first very schematic and partial side view of a lighting device (with connection device) according to the present invention and of an electrified guide, FIG. 10 shows two possible different and alternative schemes for moving a mechanical contact device of the connection device of FIG. 9.

Figure 11:
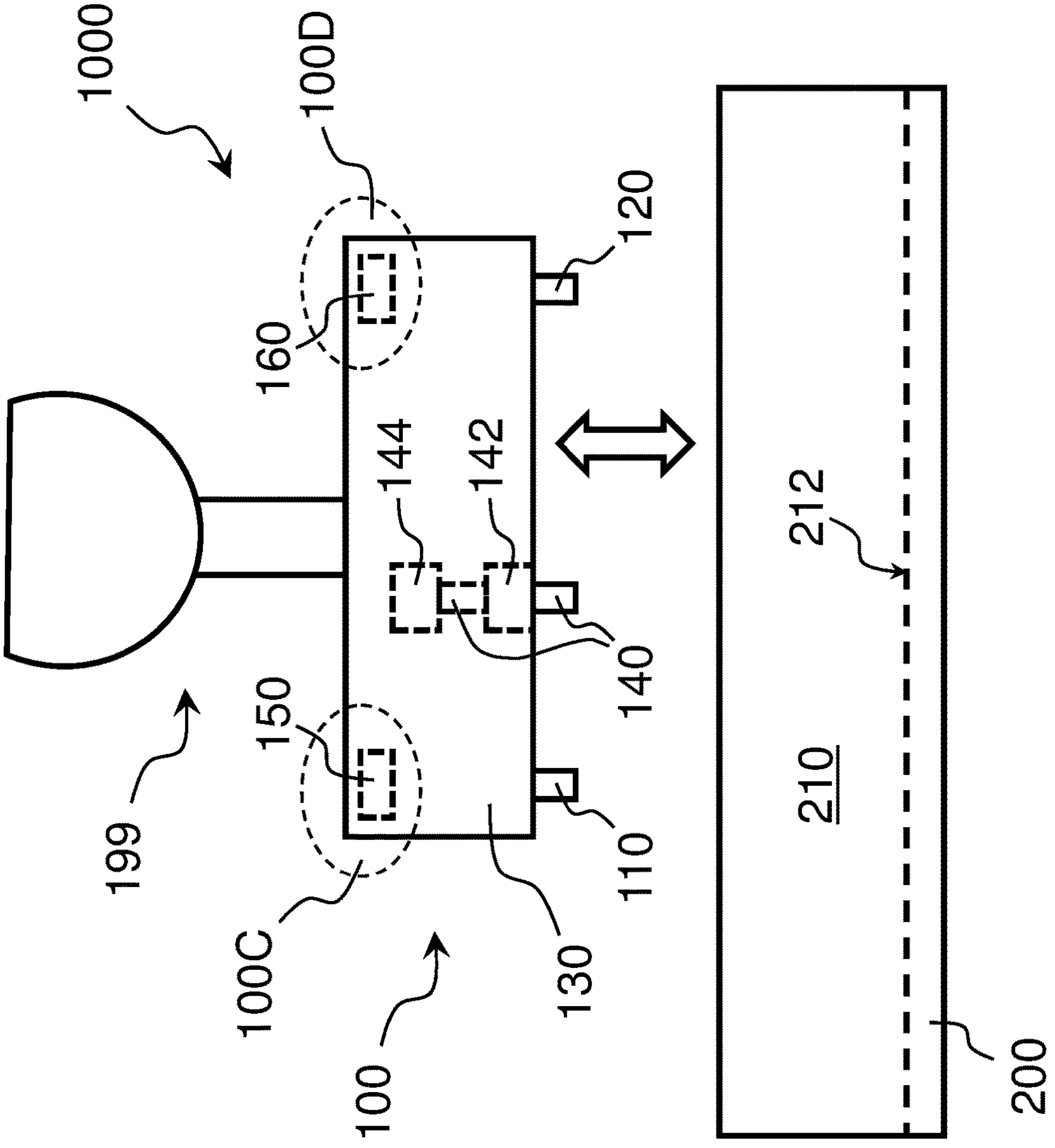
Figure 12A:
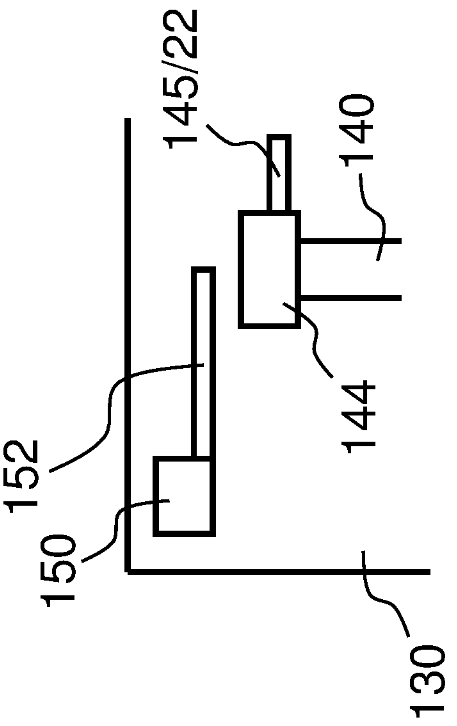
Figure 12B:
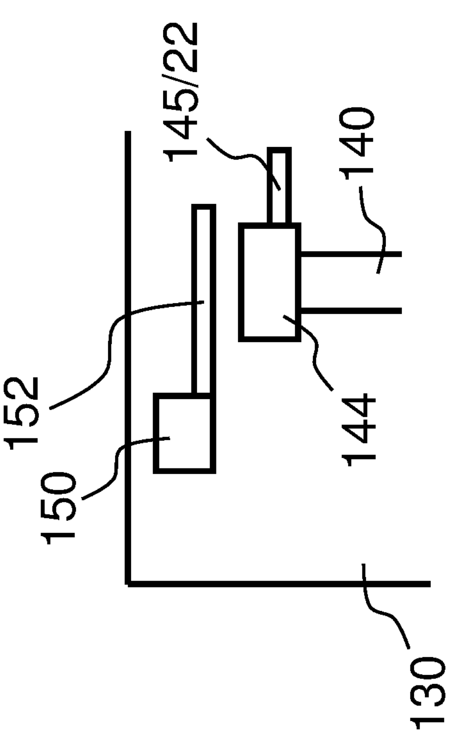
Figure 12C:
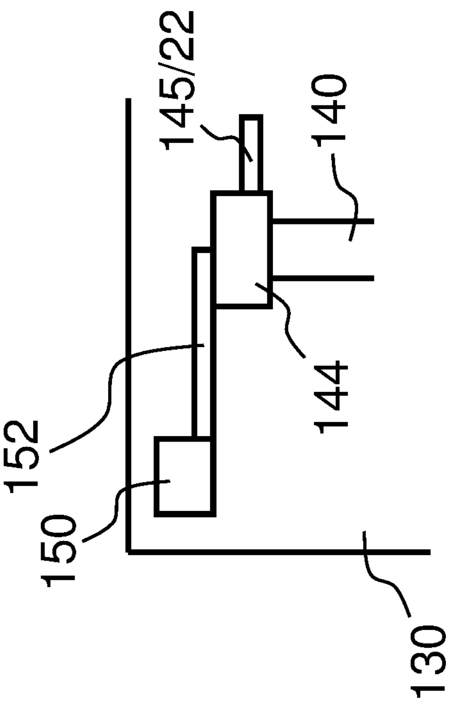
Figure 12D:
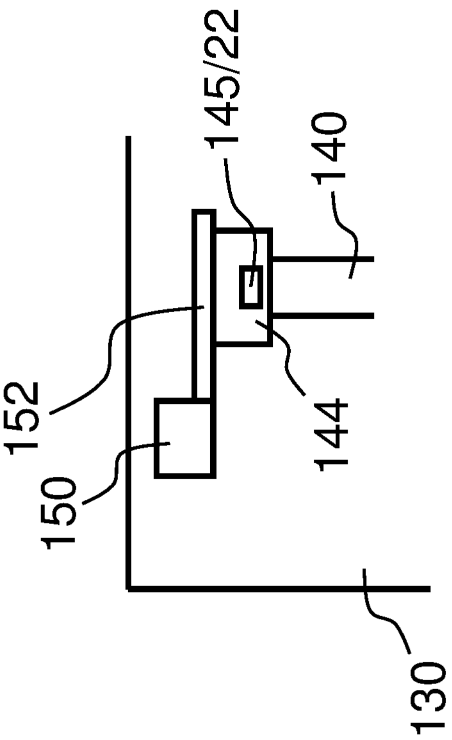
Figure 13:
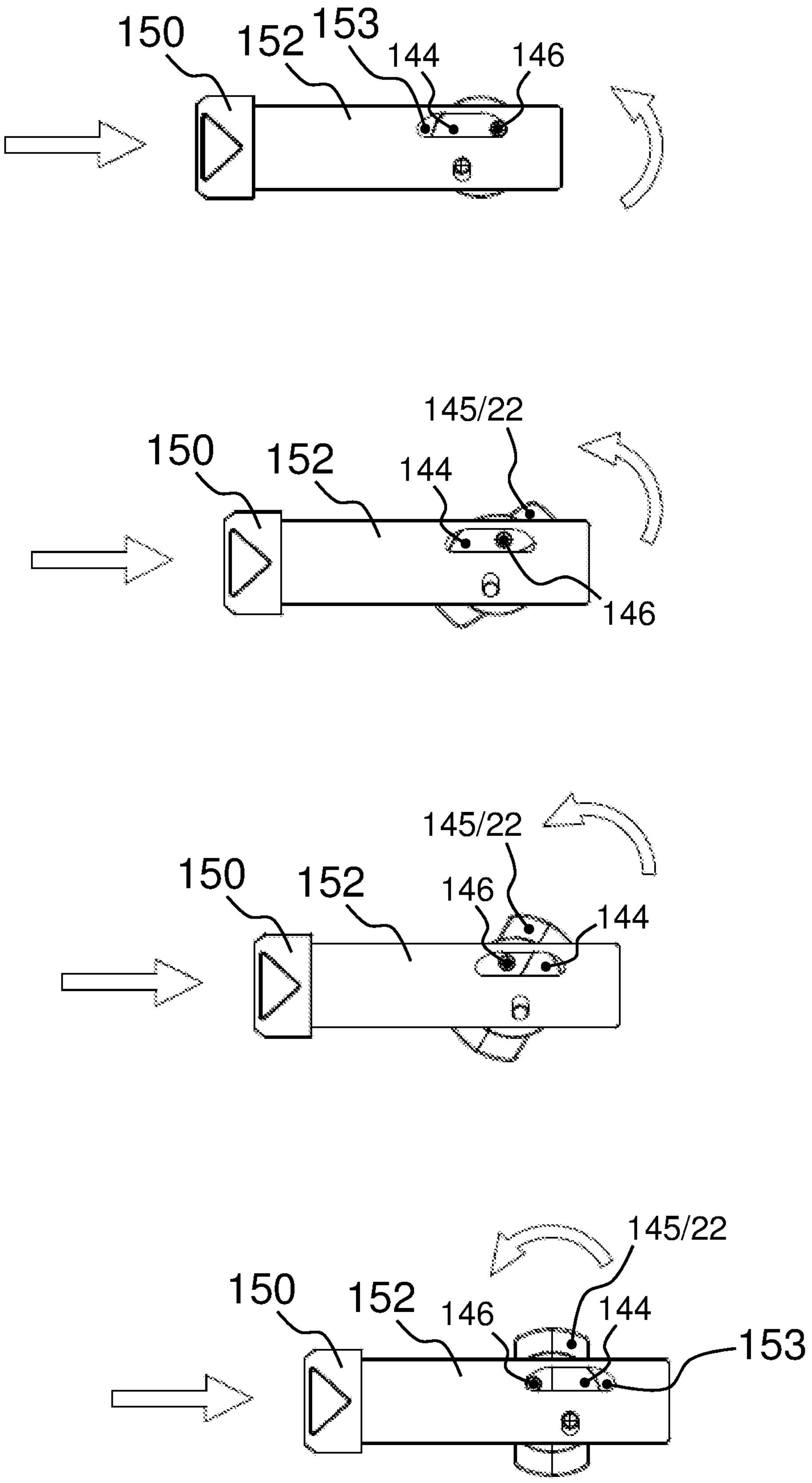
Figure 14:
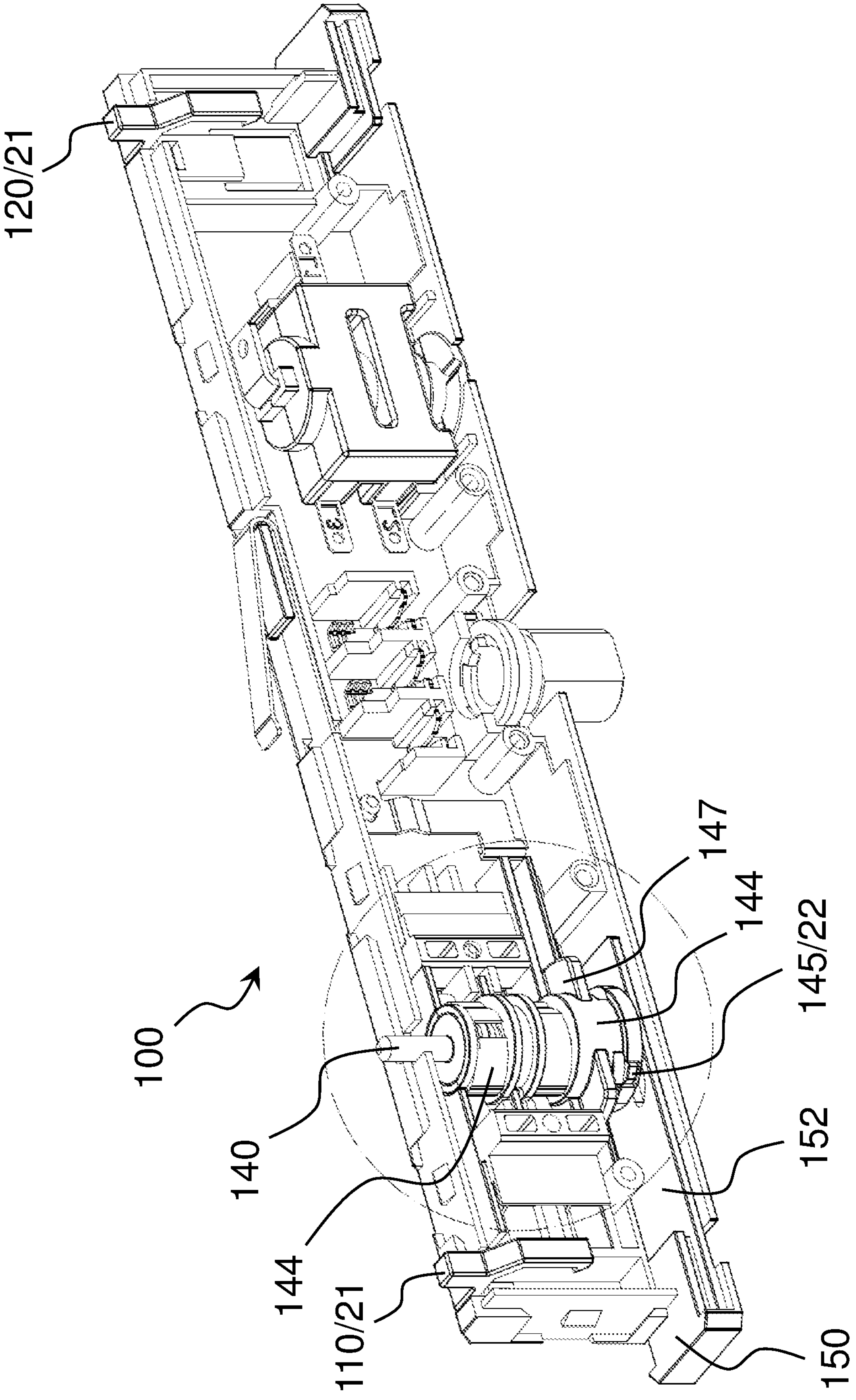
Figure 15A:
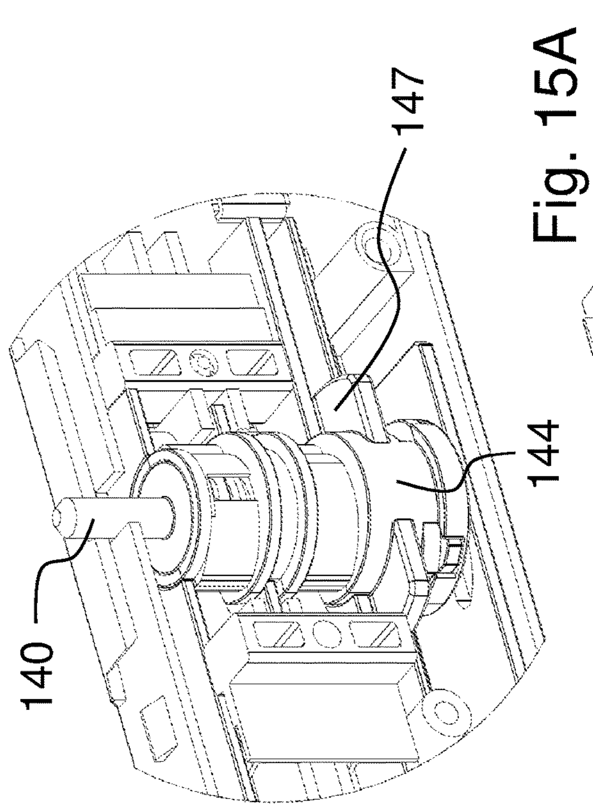
Figure 15B:
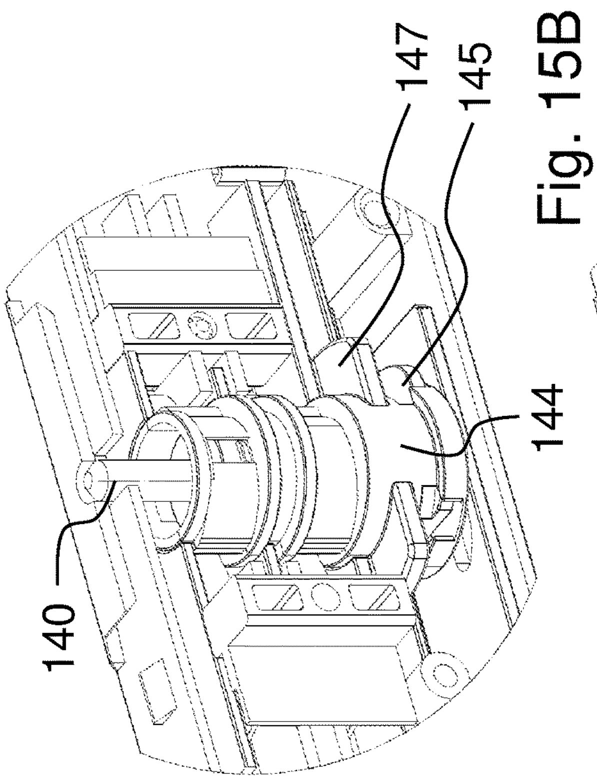
Figure 15C:
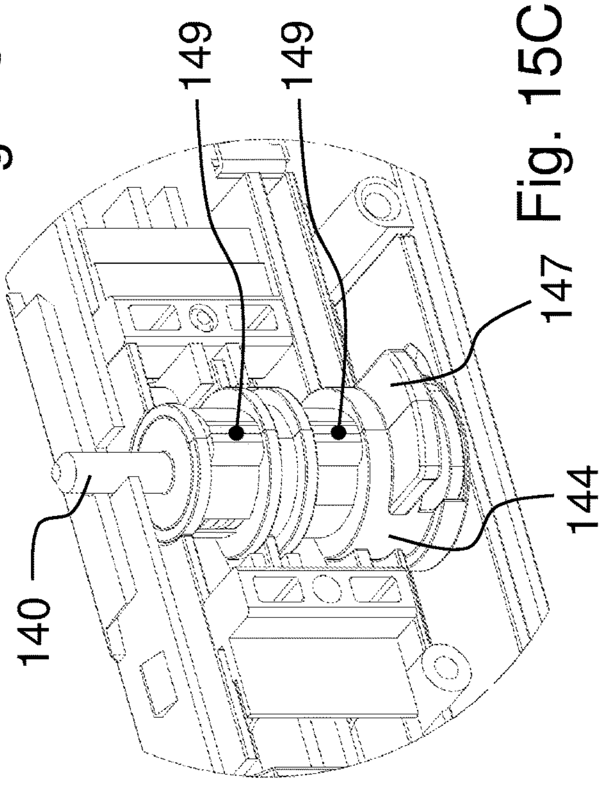
Figure 15D:
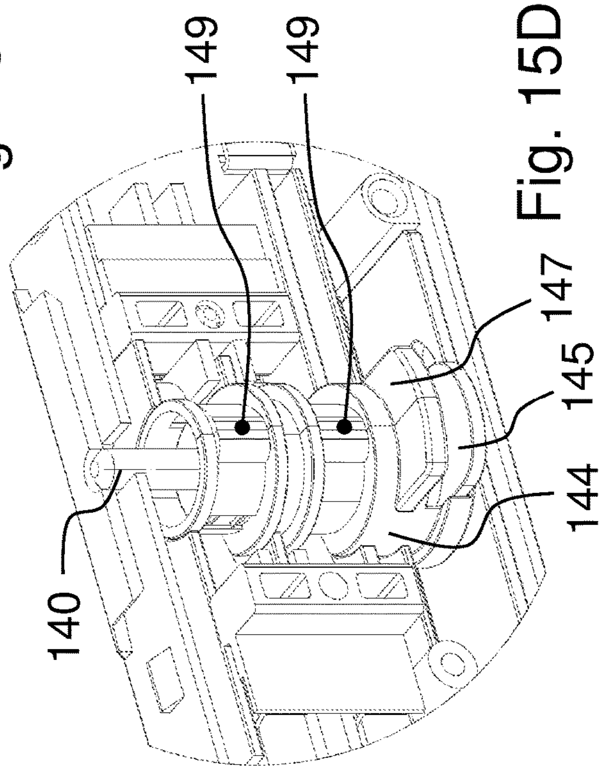
Figure 16:
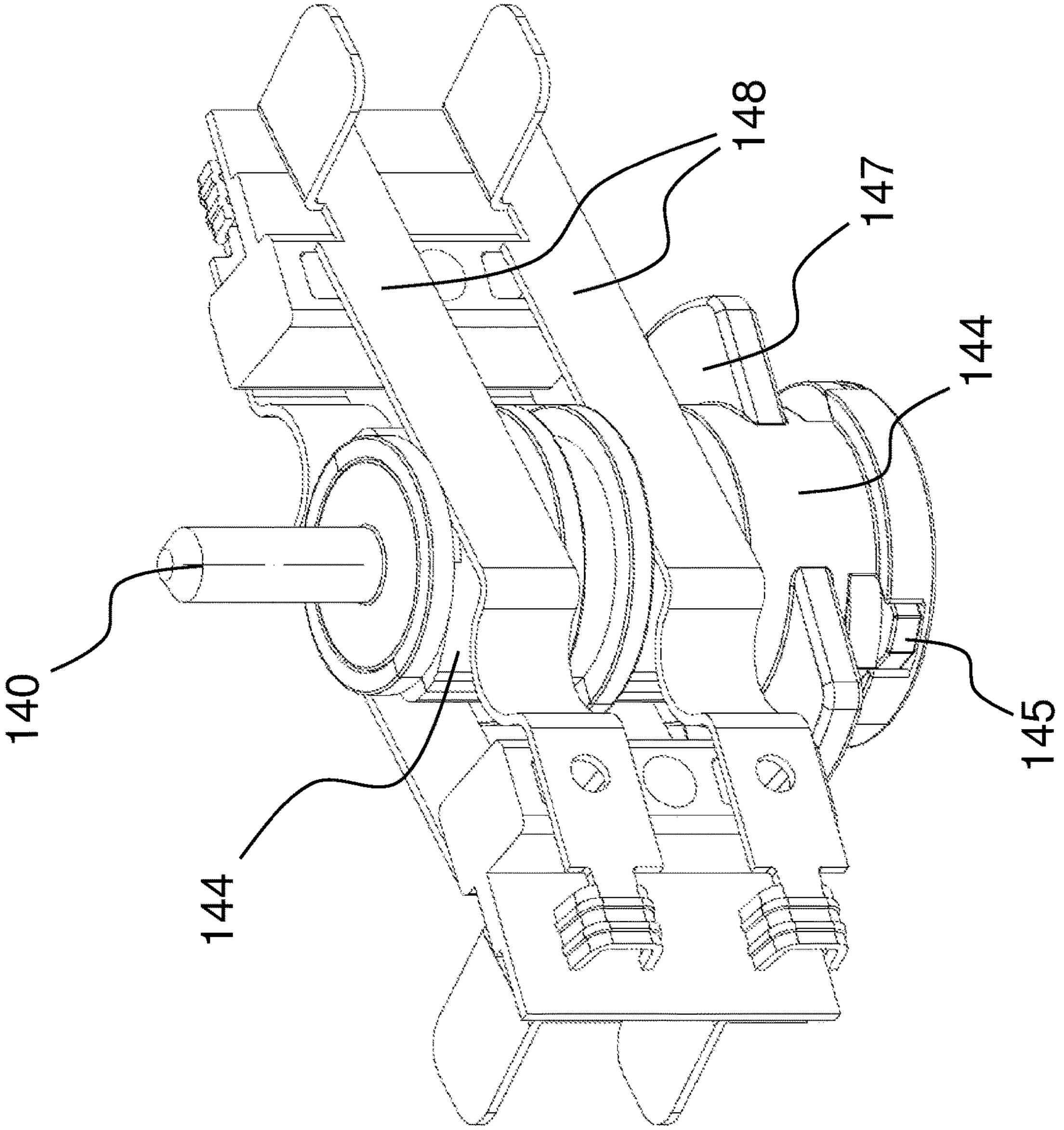
Figure 17:
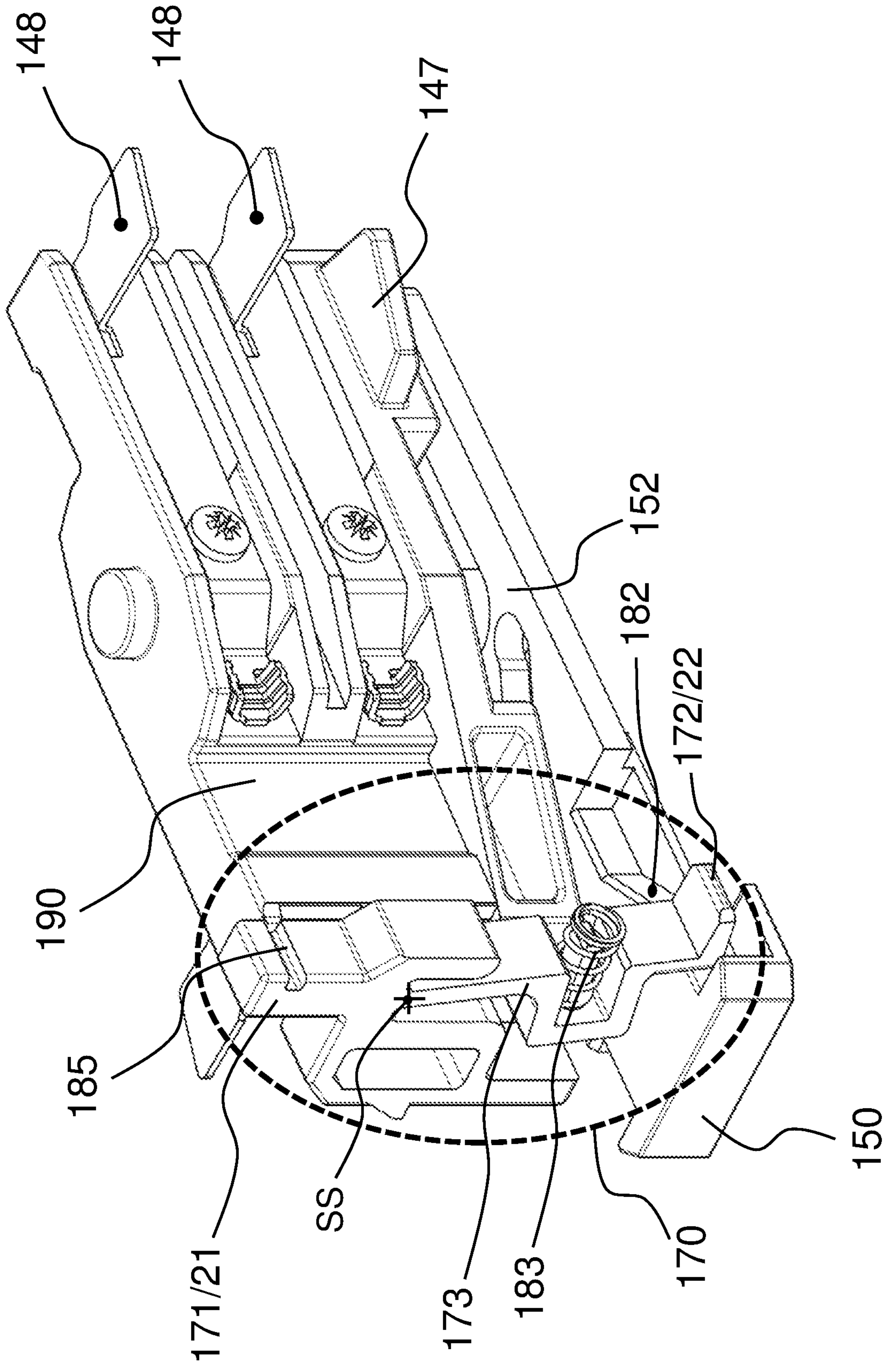

FIG. 11 shows a second very schematic and partial side view of a lighting device (with connection device) according to the present invention and of an electrified guide, FIG. 12 schematically shows four different configurations of the connection device of FIG. 9 and FIG. 11 adapted to explain an example of combined operation of a command device and of a pin of the device, FIG. 13 schematically shows three different configurations of the connection device of FIG. 9 and FIG. 11 adapted to explain an example of combined operation of a slider of the device, FIG. 14 shows a sectional view of a first example of embodiment of the connection device according to the present invention, FIG. 15 partially shows four different configurations of the connection device of FIG. 14, FIG. 16 shows electrical contacts of the connection device of FIG. 14, FIG. 17 shows a partial view of a second example of embodiment of the connection device according to the present invention, FIG. 18 shows an example of combined operation of a command device and of a mechanical contact device of the device of FIG. 17, and FIG. 19 shows two different configurations of the mechanical contact of the connection device of FIG. 17.

As can be easily understood, there are various ways of practically implementing the present invention which is defined in its main advantageous aspects in the appended claims and is not limited either to the following detailed description or to the appended claims.

Hereinafter, the expression "adapted to abut" will be used in relation to some components of examples of embodiment; it is understood that this expression does not mean that a component must in any case abut but simply that at least in one or more operating conditions it is abutting.

DETAILED DESCRIPTION

The connection device (for example the one indicated with 20 or 100 in the figures) according to the present invention is used for an electrified guide lighting system (for example the one indicated with 10 or 200 in the figures); in particular, these are guides for three-phase power supply.

With non-limiting reference to FIGS. 9-11, the electrified guide 200 is provided with a longitudinal groove 210 and the connection device 100 is adapted to be completely inserted into the electrified guide 200, in particular into the longitudinal groove 210 of the electrified guide 200.

According to embodiments of the present invention that are alternative to those of FIGS. 9-11, the insertion may not be complete; for example, there may be a 1-5 mm protrusion on a side or both sides of the guide.

In FIG. 5 and FIG. 6 and FIG. 8, the connection device can be considered completely inserted into the longitudinal groove of the electrified guide; in FIG. 7, it can be considered that there is no protrusion on the left side and that there is a slight protrusion on the right side.

In the lower part of all these figures, a rectangular element which projects remarkably from the groove, but which is not part of the connection device is visible; in particular, it is a stem for supporting a lighting body similar to the stem shown in FIG. 9 and FIG. 11.

The connection device 100 comprises at least one mechanical contact device adapted to abut against a bottom surface of said longitudinal groove when the connection device is completely (or possibly almost completely) inserted into the electrified guide (see arrow in FIG. 9 which corresponds to the preferred insertion and extraction direction of the device); in the example of FIG. 9, there are two mechanical contact devices 110 and 120, and they are adapted to abut against a bottom surface 212 of the longitudinal groove 210 when the connection device 100 is completely inserted into the electrified guide 200; this also applies to the example of FIG. 11. In FIG. 5, it can be seen a mechanical contact device 21 abutting against a bottom surface 13-1 (specifically in a portion thereof) of the longitudinal groove 12-1 of the guide 10-1 in a condition of "complete insertion" of the connection 20 into the electrified guide 10-1. In FIG. 7, it can be seen a mechanical contact device 21 abutting against a bottom surface 13-3 (specifically in a portion thereof) of the longitudinal groove 12-3 of the guide 10-3 in a condition of "complete insertion" (as stated previously, there is a protrusion of the connection device by a few mm on the right side of the guide) of the connection device 20 into the electrified guide 10-3. In figures FIG. 6 and FIG. 8, there is no abutment between mechanical contact device and bottom surface of the longitudinal groove because the device has been removed (or moved), but there is an abutment between the casing of the connection device and the bottom surface of the longitudinal groove.

According to the present invention, the mechanical contact device can be removed or (preferably) moved so that the connection device can be adapted to electrified guides having longitudinal grooves of different depth.

By considering FIG. 1+FIG. 5 and FIG. 3+FIG. 7, it can be noted that the bottom surface of said groove (13-1 and 13-3 respectively) is asymmetrical with respect to the plane of symmetry of the guide and that the mechanical contact device is off-centre with respect to the plane of symmetry of the device. In this way, if an attempt were made to insert the device (20) into the guide (10-1 and 10-3 respectively) in the opposite direction to that shown in these figures, it would not be possible to obtain a complete insertion (and therefore electrical connections between the device and the guide) because a mechanical contact would occur when the device is still partially outside the guide. Therefore, the mechanical contact device according to the present invention can be advantageously shaped and/or located so that it abuts (against a bottom surface of said longitudinal groove) differently depending on the sense/side of insertion of the connection device into the electrified guide so that to avoid insertions in the wrong sense/side.

The figures from FIG. 5 to FIG. 8 schematically illustrate the case of removable mechanical contact device. When installing the connection device, the operator determines the depth of the groove of the guide and mounts/disassembles one or more mechanical contact devices on the device (in particular on the casing of the device) depending on the depth. In the simplest case, there are only two possible depths and therefore devices of only one length are provided; in general, devices of different lengths can be provided.

According to alternative solutions in which the mechanical contact device can be moved, in the simplest case there are only two possible positions (typically, a first position in which the mechanical contact device projects from the casing of the connection device and a second position in which the device does not project from the casing); in general, several positions can be provided (typically, a non-projecting position and other positions with different protrusions).

The mechanical contact device (for example those indicated with 110 and 120 in FIG. 9 and FIG. 10) can be linked (directly or indirectly) to a casing (for example the casing 130) of the connection device; the device can be linked to an internal body of the device that is fixed to the casing of the device, there is therefore an indirect link.

In FIG. 10 two possible different and alternative schemes of movement of a mechanical contact device of the connection device of FIG. 9 are shown; they are thus two kinematic links.

In the lower part of FIG. 10, the mechanical contact device 120 is adapted to rotate around an axis RR that is fixed with respect to the casing 130, but only before insertion of the device 100 into the guide 200 (during and after insertion it is fixed); in a first position (for example vertical) the device 120 projects from the casing 130 and in a second position (for example horizontal—drawn with a dashed line) the device 120 does not project from the casing 130.

In the upper part of FIG. 10, the mechanical contact device 120 is adapted to shift along an axis TT that is fixed with respect to the casing 130, but only before insertion of the device 100 into the guide 200 (during and after insertion it is fixed); in a first position the device 120 projects from the casing 130 and in a second position (drawn with dashed line) the device 120 does not project from the casing 130; there might be other positions with different protrusion from the casing 130.

It is important that the mechanical contact device (if any) is adapted to be moved with respect to the casing only before insertion into the guide of the device (during and after insertion it is fixed).

The mechanical contact device can be located at a central zone or an end zone of the connection device; the terms "central" and "end" refer to the longitudinal direction of the connection device which, in use, corresponds to the longitudinal direction of the guide.

In the example of FIG. 9, there is a first mechanical contact device 110 that is located at a first end zone 100A of the connection device 100 (which is also internal with reference to the electrified guide after the device has been inserted into the guide), and a second mechanical contact device 120 that is located at a second end zone 100B of the connection device 100 (which is also internal with reference to the electrified guide after the device has been inserted into the guide). These devices can be the same or different, and the considerations made above apply to each of them.

In the example of FIG. 9, an electronic circuitry 198 (which is optional) adapted to power-supply at least a lighting device, for example the one indicated with 199, mechanically fixed and electrically connected to the device is schematically shown; the circuitry 198 receives electrical energy from the electrified guide 200 to which the device 100 is connected and transmits it to the lighting device. If the connection device according to the present invention (and the relative electrified guide) were used for applications other than lighting, the electronic circuitry 198 would be adapted to power-supply one or more non-lighting electrical and/or electronic devices.

A first advantageous aspect of the connection device according to the present invention is a pin which is retractable and which is adapted to abut against a bottom surface of a longitudinal groove of an electrified guide; this first aspect is independent of the mechanical contact device described above, even if there may be a synergy.

In the example of FIG. 11 (the analogy between FIG. 9 and FIG. 11 is noteworthy), there is a pin 140 which is retractable and which is adapted to abut against a bottom surface 212 of the longitudinal groove 210 of the guide 200.

The complete retraction of said pin (which in FIG. 5 and in FIG. 7 is partially hidden by the mechanical contact device 21 and in FIG. 6 and in FIG. 8 is hidden internally to the casing of the connection device) allows the exit of at least one mechanical element (for example and advantageously in the form of a rigid tab) from a side of a casing of the connection device; this is shown, for example in FIG. 6 and in FIG. 8, where the exited mechanical element is indicated by the reference 22. In these figures it can be noted that the mechanical element 22 is located in a seat of the electrified guide (10-2 and 10-4 respectively). It is important to observe that if the device 20 had been inserted into the guide (10-2 and 10-4 respectively) in the opposite direction to that shown in these figures, it would not have been possible to achieve the exit of the mechanical element 22 because the latter would be blocked by a wall of the guide (10-2 and 10-4 respectively). In FIG. 5 and in FIG. 7, on the other hand, the pin is not retracted and therefore there is no exit of the mechanical element 22 even when the connection device is completely inserted into the guide (10-1 and 10-3 respectively), regardless of the direction of insertion; in these cases, the correct insertion into the guide is achieved thanks to the asymmetrical positioning of the mechanical contact device 21.

It should be noted that the retraction of the pin does not cause the exit of the mechanical element, but simply makes it possible for it to exit; this concept is represented in FIG. 11 from box 144 which will be better illustrated below.

Furthermore, it should be noted that the pin is adapted to retract (i.e. to enter the casing totally or partially) during the operation of inserting the connection device into the electrified guide and if the guide is not very deep, and is adapted to advance (i.e. to exit from the casing) while carrying out the reverse operation; if the guide is very deep, the pin may not even come into contact with the bottom of the groove of the electrified guide and therefore may not retract or advance.

Finally, in a solution based on a retractable pin, before insertion the pin is "completely advanced" i.e. it projects largely from the casing of the device. During insertion, if the guide is not very deep, the pin will retract and reach its maximum retraction when the device is fixed in the guide; in this case, it can be said that the pin is "completely retracted", although the pin may project and projects by a little from the casing of the device.

In the example of FIG. 11, the retraction of the pin is countered by a spring, for example by the spring 142.

The connection device according to the present invention can comprise a mobile command device, and it is for example the actuation of this device that causes the exit of the mechanical element from a side of a casing of the connection device if the pin is completely retracted. In the example of FIG. 11, there are two mobile command devices 150 and 160 which are in particular two sliding sliders, each of which is adapted to be actuated manually (by acting directly with the fingers or with a tool) for example by an operator.

FIG. 12 schematically show four different configurations of the connection device of FIG. 9 and FIG. 11 adapted to explain the combined operation of a command device and of a pin of the device; the slider 150 is associated with a rod 152 (for example in the form of a plate, i.e. relatively thin, for example 2-4 m, and relatively wide, for example 10-20 mm) and the internal body 144 is associated with the pin 140 and with a mechanical element 145 (for example and advantageously in the form of a tab) (which corresponds to the mechanical element 22 in FIG. 6 and FIG. 8). In FIG. 12A, the body is mechanically uncoupled from the rod 152; therefore, a shift of the slider 150 with the relative rod 152 does not cause any movement of the body 144, as can be seen in FIG. 12B. In FIG. 12C, the pin 140 is completely retracted and hence the body 144 is mechanically coupled to the rod 152; therefore, a shift of the slider 150 with the relative rod 152 causes a rotation of the body 144, as can be seen in FIG. 12D, with the relative mechanical element 145 exiting from a side of a casing of the connection device.

Mechanisms for converting a linear motion (for example the motion of the rod 152) into rotary motion (for example the motion of the body 144) have been known for a long time; the most common is the "rack"; hereinafter, particular mechanisms suitable for the present invention will be described. Particularly advantageous mechanisms of this type are those based on two gears, in particular a linear gear and a curved gear; according to particularly simple implementations, each gear can also have only one or two "teeth" (see for example FIG. 13—this can also be considered an extremely simple form of "rack").

According to the example of FIG. 12, there are two conditions: one of mechanical coupling and one of mechanical uncoupling between rod and body.

Alternatively, two conditions can be envisaged, both of mechanical coupling between rod and body but different (like in the example of FIG. 14-16); in both conditions, the shift of the rod 152 causes rotation of the body 144; it is switched from the first condition to the second condition due to the retraction of the pin 140: the mechanical element 145 is mechanically coupled to the body 144 so that it always rotates together with the body 144. If the pin 140 is completely retracted the coupling is such that the mechanical element 145 exits from a side of the casing 130 when the body 144 rotates and if the pin 140 is completely advanced the coupling is such that the mechanical element 145 does not exit from a side of the casing 130 when the body 144 rotates. It can be said that the retraction of the pin 140 causes a different distance of the mechanical element 145 with respect to the axis of rotation of the body 144 and therefore protrusion during the rotation phase.

A second advantageous aspect of the connection device according to the present invention is a slider which is adapted to act as a command device for a mechanism internal to the connection device, in particular for the exit of electrical contacts and/or mechanical elements from the casing of the connection device; this second aspect is conceptually independent of the mechanical contact device described above and of the pin described above, even if there can be a synergy.

It should be noted that in the example of FIG. 14 and FIG. 15 and FIG. 16, there is a mechanical element 145 adapted to exit from a side of the casing (depending on the condition of the pin 140 as explained above), there are two other mechanical elements 147 adapted to exit from two opposite sides of the casing (regardless of the condition of the pin 140—alternatively their exit could be dependent on the condition of a retractable pin), and there are electrical contacts 148 adapted to exit from the sides of the casing (regardless of the condition of the pin 140—alternatively their exit could be dependent on the condition of a retractable pin).

The device can therefore comprise at least one command device located at an external end zone of the connection device so that it is accessible to the operator to be actuated manually (by acting directly with the fingers or with a tool).

In the example of FIG. 11, there is a first command device 150 that is located at a first end zone 100C of the connection device 100, and a second command device 160 that is located at a second end zone 100D of the connection device connection 100; the term "end" refers to the longitudinal direction of the connection device which, in use, corresponds to the longitudinal direction of the guide. The first zone 100C and the second zone 100D of the connection device 100 are placed frontally so that the two mobile command devices 150 and 160 are accessible by an operator when the device has been inserted into the guide. These devices can be the same or different; typically, these devices serve to cause exits of distinct components of the connection device; the shift of one (or both) of these devices can cause movements (in particular rotations) of one or more components internal to the connection device; the considerations made previously apply to each of them.

Referring to the example of FIG. 12 and FIG. 13, sliding of the slider 150 causes, through the rod 152, the exit of electrical contacts (not shown in these two figures, but shown in FIG. 16) at least from one side of a casing 130 of the connection device 100. In particular, sliding of the slider 150 causes a shift of the rod 152 which causes a rotation of the body 144.

It should be noted that the body 144, which is a body internal to the device 100, has been mentioned both in relation to the exit of the mechanical element 145 and in relation to the exit of contacts. Indeed, there is the possibility of associating both of them, i.e. mechanical elements and contacts, to the same internal rotating body (as shown in particular in FIG. 14 and FIG. 15 and FIG. 16). Obviously, there is also the different possibility of using distinct rotating bodies internal to the device, in particular and for example a first body for at least one mechanical element and a second body for at least one electrical contact.

Mechanisms for converting a linear motion (for example the motion of the rod 152) into rotary motion (for example the motion of the body 144) have been known for a long time; the most common is the "rack"; hereinafter and with reference to FIG. 13, a particular mechanism suitable for the present invention is described.

In FIG. 13, the rod 152 has a shaped slot 153 and the body 144 is associated with a pin 146 adapted to move in, in particular to slide along, the slot 153 when the body 144 is mechanically coupled to the rod 152. Thanks to the shape of the slot a shift of the rod causes a rotation of the body. Obviously, more than one slot and more than one pin can be provided, as shown in FIG. 13 in which there is a further slot and a further pin.

In the example of embodiment 100 shown in FIG. 14 and FIG. 15 and FIG. 16, there is a single internal rotating body 144 associated with a mechanical element 145 and two mechanical elements 147 and four electrical contacts 148 as well as with a retractable pin 140; then there is an elongated plate 152 associated with a command device 150, which can shift longitudinally (see for example FIG. 13). In the configuration of FIG. 15A, the pin 140 is not retracted and the plate 152 is not shifted; the mechanical elements 147 are arranged longitudinally and internally to the casing of the device 100; the element 145 is internal to the body 144 and therefore not visible. In the configuration of FIG. 15B, the pin 140 is retracted and the plate 152 is not shifted; the mechanical elements 147 are arranged longitudinally and internal to the casing of the device 100; the element 145 exits from the body 144 in the longitudinal direction but is internal to the casing of the device 100. In the configuration of FIG. 15C, the pin 140 is not retracted and the plate 152 is shifted; the mechanical elements 147 are arranged transversely (due to a rotation of the body 144 for example by 90°) and their end part exits from the casing of the device 100; the element 145 is internal to the body 144 and therefore not visible. In the configuration of FIG. 15D, the pin 140 is retracted and the plate 152 is shifted; the contacts 147 are arranged transversely (due to a rotation of the body 144 for example by 90°) and their end part exits from the casing of the device 100; the element 145 is arranged transversely (due to a rotation of the body 144 for example by 90°) and its end part exits from the casing of the device 100.

It should be noted that, in FIG. 14 and in FIG. 15, no electrical contact is shown, even if electrical contacts are provided in the relative connection device 100; in FIG. 16, electrical contacts 148 of the connection device 100 of FIG. 14 and FIG. 15 are shown (specifically four electrical contacts, two turned towards a first side of the device on the front in FIG. 16 and two towards a second side of the device at the rear in FIG. 16). In FIG. 16, the body 144 and the retractable pin 140 are also visible.

Each electrical contact 148 of FIG. 16 is a shaped metal element linked to a first end (on the left in FIG. 16) and free at a second end (on the right in FIG. 16) which is for example provided with a fin; in this example, it is precisely the fin that is adapted to exit from the casing and make the electrical connection with the electrical conductors of the electrified guide. The body 144 has an eccentric element (indicated with 149 in FIG. 15C and in FIG. 15D) for each electrical contact 148 or an eccentric element for each pair of electrical contacts (this alternative is not shown in the figures); following the rotation of the body 144, for example by 90°, an eccentric element 149 pushes on an electrical contact 148 and causes the exit thereof (specifically, the exit of the fin) from one side of the casing 130 of the connection device 100.

In the connection device 100 of FIG. 14, the slider 150 is located at an end and/or front zone of the device 100. The plate 152, which is fixed to the slider 150, is adjacent (or parallel) to a front wall of the casing of the device 100 and is internal to the casing; it is adapted to shift always remaining adjacent (or parallel) and internal.

According to an example of embodiment different from that of FIG. 14 and FIG. 15, there are two internal rotating bodies (similar to the body 144 of these figures) with rotation axes parallel to each other; a mechanical element (such as the element 145) is associated, for example, with the first rotating body (which is preferably also associated with a retractable pin, such as the pin 140) and two electrical contacts (such as the contacts 148) are associated, for example, with the second rotating body (which is not typically also associated with a retractable pin, such as the pin 140); a shift of an elongated plate (such as the plate 152) causes a rotation for example by 90° of both internal rotating bodies with effects similar to those described in the previous paragraph.

As already mentioned, FIG. 9 and FIG. 11 show an example of embodiment of a lighting device 1000 according to the present invention. The device 1000 comprises a connection device 100 and at least a lighting device 199 mechanically fixed and electrically connected to the connection device 100; electrical energy can pass from the electrified guide 200 to the lighting device 199. In these figures, by way of example, a lighting body (upper element substantially in the shape of a circle) and a support stem (lower element in the shape of a rectangle) of the lighting body have been shown. Previously, three technical aspects have been described (removable or movable mechanical contact device, retractable pin and mobile slider) which can be advantageously combined with each other. According to a first example of combination, contact device and pin can both be used so as to avoid incorrect insertions of the connection device into the electrified guides (and therefore incorrect electrical connections) and the same slider can be used to cause the exit of both at least one mechanical element and of at least one electrical contact that are both mounted on a single internal rotating body.

According to a second example of combination, contact device and pin can both be used so as to avoid incorrect insertions of the connection device into the electrified guides (and therefore incorrect electrical connections) and the same slider can be used to cause the exit of both at least one mechanical element and of at least one electrical contact that are respectively mounted on a first and a second internal rotating body.

According to a further example of embodiment shown in FIG. 17-19, a mechanical contact device adapted to abut against a bottom surface (in particular of a longitudinal groove) of an electrified guide and a mechanical element adapted to exit from a (in particular casing of a) connection device are advantageously integrated into a single device which will be referred to hereinafter as “integrated device” and is indicated as a whole with the reference 170 in FIG. 17-19; the integrated device is adapted to be contained in part (in particular in large part) inside the casing of the device.

With reference to FIG. 17, the integrated device 170 is substantially formed by a portion 171 adapted to abut against a bottom surface of the electrified guide and a portion 172 adapted to exit from a connection device (in particular transversely, where the term “transversely” refers to the transverse direction of the connection device which, in use, corresponds to the transverse direction of the guide).

In particular, the portion 171 is for example a prismatic protrusion and the portion 172 is for example in the form of a rigid tab connected to a body of the integrated device 170 by means of a rod 173.

Figure 19A:
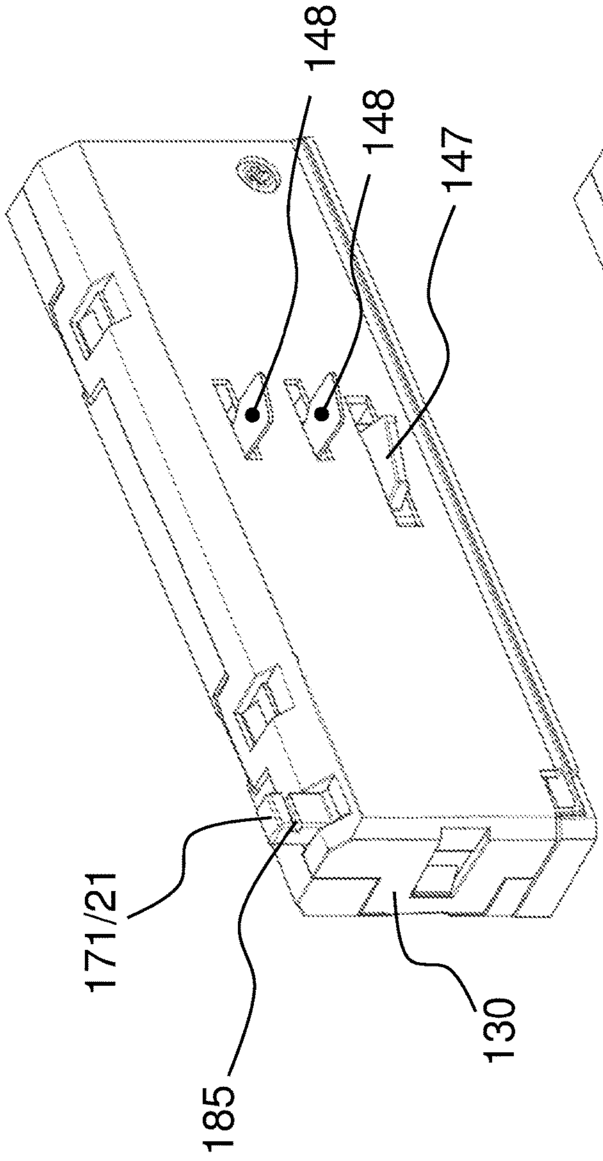
Figure 19B:
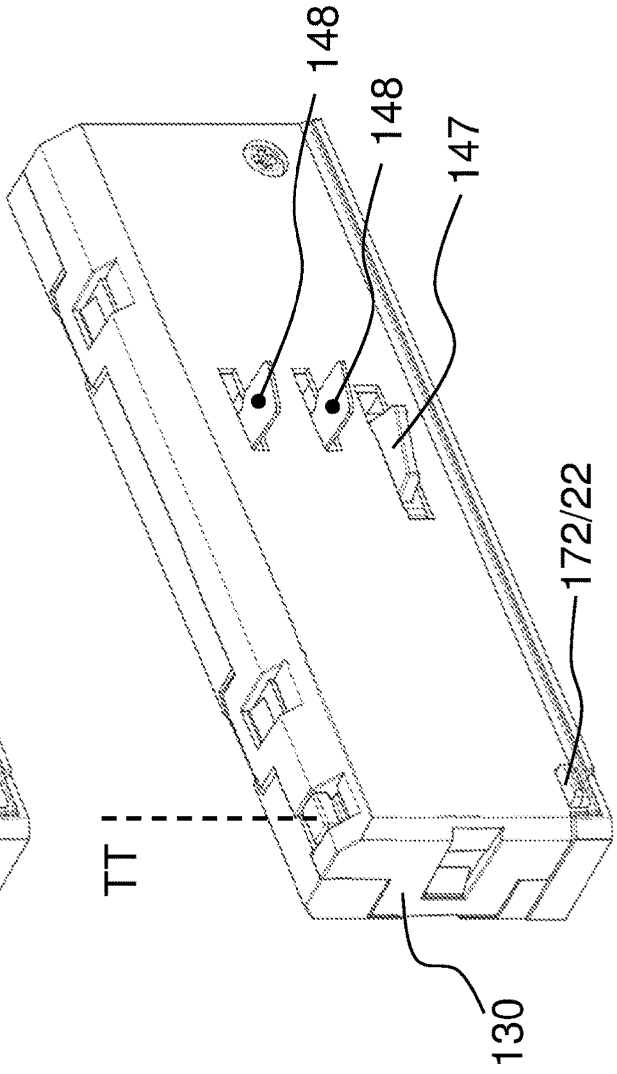

As shown in FIG. 19, the integrated device 170 is adapted to shift along an axis TT (but only before insertion of the device 100 into the guide 200—during and after insertion it is fixed) that is fixed with respect to the casing 130; in a first position shown in FIG. 19A, the integrated device 170, in particular the portion 171, projects from the casing 130 and in a second position shown in FIG. 19B, the integrated device 170, in particular the portion 171, does not project from the casing 130.

Advantageously and with reference to FIGS. 17 and 19, the portion 171 has a groove 185 accessible by an operator from the outside of the casing 130 of the connection device; in particular the portion 171 can be moved by an operator along the axis TT by acting directly or indirectly on this portion, for example by engaging the groove 185 with a tool (or by acting directly with the fingers) and by exerting a (traction) force in a first sense for extracting the portion 171 from the casing 130 and a (pushing) force in a second sense for retracting the portion 171 inside the casing 130.

The portion 172 of the integrated device 170 is further adapted to exit from the casing 130 after insertion of the device 100 into the guide 200 and by effect of a mobile command device; in particular, the rod 173 is adapted to rotate around an axis SS (see FIG. 17) that is fixed with respect to the integrated device 170, causing the portion 172 to exit/re-enter from/into the casing 130 of the connection device (the movement will be described in detail hereinafter).

Advantageously and as shown in FIG. 19, the connection device can comprise at least one integrated device at an end zone of the connection device, where the term “end” refers to the longitudinal direction of the connection device which, in use, corresponds to the longitudinal direction of the guide; in particular, this is the integrated device 170 referred to in the previous paragraphs.

The connection device according to the present invention can comprise a mobile command device, and it is, for example, the actuation of this device that causes the exit of the portion 172 from a side of the casing 130 of the connection device if the portion 171 is completely retracted.

In the example of FIGS. 17 and 18, the mobile command device comprises a sliding slider 150 adapted to be actuated manually (by acting directly with the fingers or with a tool) for example by an operator; in particular, the slider 150 is associated with a rod 152 of the mobile command device which is, for example, in the form of a plate.

Figure 18A:
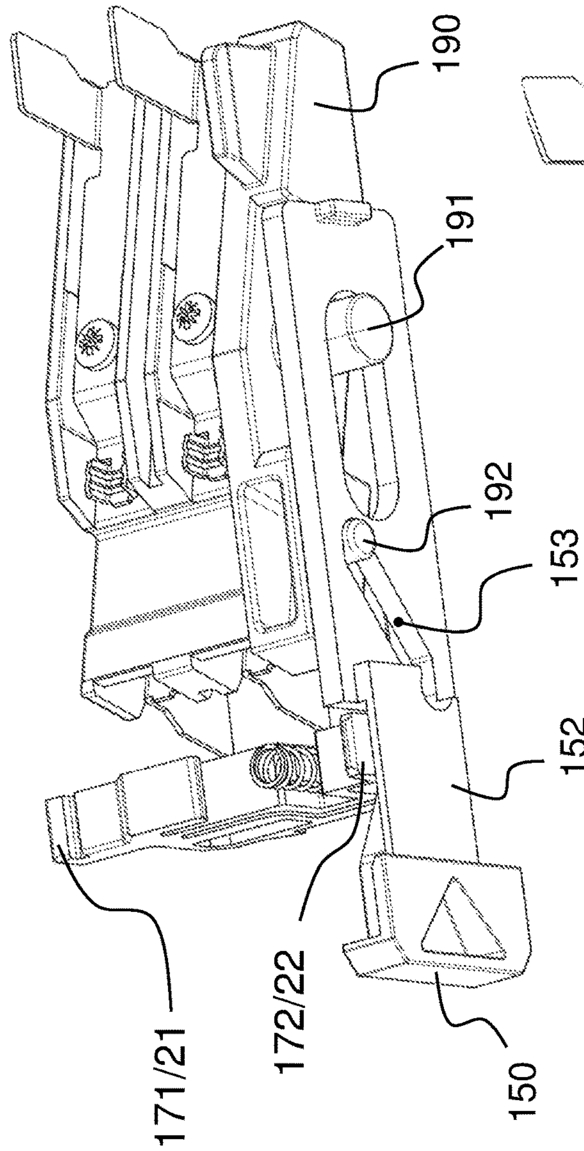
Figure 18B:
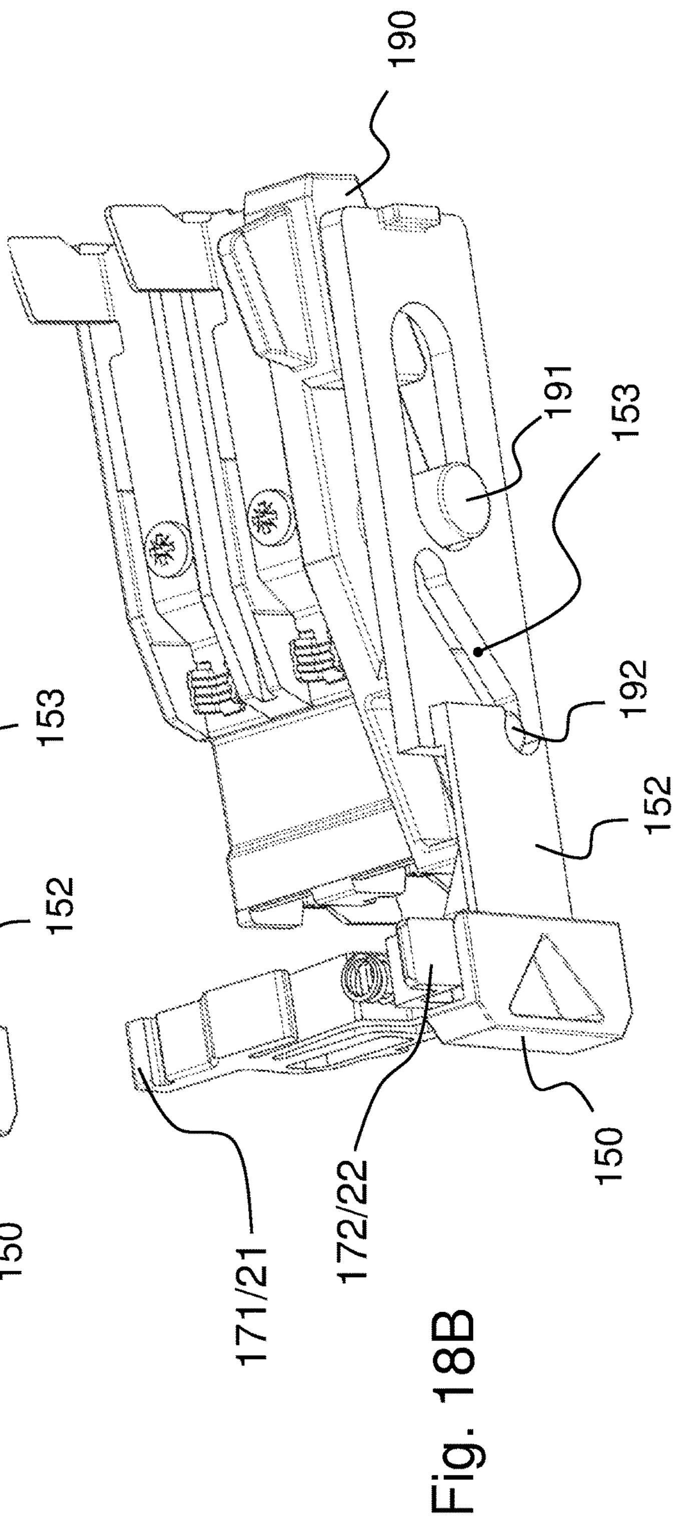

FIGS. 18A and 18B are adapted to explain the combined operation of the mobile command device 150+152 and of the integrated device 170.

It should be noted that there are two combined operating conditions of the mobile command device 150+152 and of the integrated device 170: one of mechanical coupling and one of mechanical uncoupling. These conditions are defined by the coupling or uncoupling of an end zone of the rod 173 (in particular comprising the portion 172) with a recess (in particular an inclined wall 182) of the mobile command device; it should be noted that this recess comprises an inclined wall 182 and, at the two ends thereof, two wall portions parallel to each other and to the longitudinal direction respectively, a first portion farther away from an internal surface of the casing 130 and a second portion closer to the internal surface of the casing 130.

In the mechanical coupling condition, as shown in FIGS. 17 and 18, the portion 171 of the integrated device 170 is in the retracted position, i.e. it does not exit from the casing of the connection device. In this condition, the end zone of the rod 173 comprising the portion 172 is adapted to be in contact with the walls of the recess of the mobile command device.

It should be noted that in this operating condition it is the casing 130 of the connection device which abuts against the bottom surface of the electrified guide when the device is completely or almost completely inserted into the electrified guide.

In particular and as shown in FIG. 18A, the condition in which the mobile command device is not actuated corresponds to the condition in which the portion 172 of the integrated device 170 does not exit from the casing 130 and the end zone of the rod 173 is in contact with the portion of the wall which is farther away from the casing 130. When the mobile command device is actuated (in particular shifted from a first position shown in FIG. 18A to a second position shown in FIG. 18B), the end zone of the rod 173 slides along the inclined wall 182 until it reaches the portion of the wall closest to the casing 130 (see FIG. 17 and FIG. 18B).

A shift of the mobile command device therefore causes a rotation of the rod 173 around the axis SS caused by the sliding of the end zone of the rod 173 along the wall portions; in particular, the rotation is caused by the movement of the end zone of the rod 173 which passes from a position at the farthest portion to a position at the closest portion; the rotation of the rod 173 in turn causes the side exit of the portion 172 linked to the rod 173 from the casing 130 (see FIG. 19B).

In the condition of mechanical uncoupling between the end zone of the rod 173 and the recess of the mobile command device, the portion 171 of the integrated device 170 is in the extracted position, i.e. it exits from the casing 130 of the connection device so that it abuts against a bottom surface of the electrified guide; consequently, the entire integrated device 170 is shifted along the direction of the axis TT; consequently, the end zone of the rod 173 is not in contact with the recess of the mobile command device, in particular it does not slide thereon. In other words, when the end zone of the rod 173 and the recess of the mobile command device are in the mechanical uncoupling condition, a shift of the mobile command device does not cause the exit of the portion 172 of the integrated device 170.

Advantageously, the integrated device 170 further comprises an elastic element, in particular a spring.

With reference to FIG. 17, the spring 183 exerts a return force on the rod 173 of the integrated device 170; in particular, by means of the spring 183 the rod 173 is kept in contact with the recess of the mobile command device in the case of the mechanical coupling just described.

It should be noted that the slider 150 and rod 152 assembly is further adapted to act as a mobile command device for a mobile body 190 internal to the connection device, shown for example in FIGS. 17 and 18, in particular for the exit of electrical contacts 148 and/or of mechanical elements 147 from the casing 130 of the connection device by rotation of the body 190.

Advantageously, the body 190 is associated with or comprises two mechanical elements 147, each adapted to exit from an opposite side of the casing, and/or two pairs of electrical contacts 148, each pair adapted to exit from an opposite side of the casing.

It should be noted that the body 190 is commanded by the same mobile command device as the integrated device 170, but the movement of the body 190 is independent of the condition of the integrated device 170.

As shown in FIG. 18, the body 190 comprises a first pin 191 which acts as a rotation pin of the body, and a second pin 192 adapted to cooperate with the plate 152; in particular, the plate 152 has a shaped slot 153 in which the pin 192 is adapted to slide. It is precisely thanks to the shape of the slot 153 that a shift of the mobile command device causes a rotation of the body 190. In particular, the slot 153 comprises a central zone inclined with respect to the longitudinal direction of the connection device, for example inclined by about 20°, and two end zones parallel to the longitudinal direction of the device, a first end zone closest to a first side edge of the plate and a second end zone closest to a second side edge of the plate.

With reference to FIG. 18A, when the mobile command device is not actuated, the pin 192 is located at a first end zone of the slot 153 and the electrical contacts 148 and the mechanical elements 147 are located inside the casing 130.

When the operator actuates (in particular shifts) the mobile command device, the pin 192 slides along the central inclined zone causing the body 190 to make a rotation movement around the axis of the pin 191, until the pin 192 reaches the second end zone of the slot 153; following the rotation of the body 190, the electrical contacts 148 and the mechanical elements 147 are in a position exiting from the casing 130.

Advantageously, the second end zone of the slot 153 comprises an undercut adapted to limit the movement of the pin 192, in particular when the connection device is inserted into the electrical guide and the electrical contacts 148 and/or the mechanical elements 147 are in an exiting position with respect to the casing 130, in particular in contact with one or more portions of the guide. A similar undercut is also provided for the first end zone of the slot 153.

The invention claimed is:

1. A connection device configured for use with an electrified guide lighting system;

wherein the electrified guide is provided with a longitudinal groove and the connection device is configured to be completely inserted into the electrified guide;

wherein the connection device comprises at least one mechanical contact device configured to abut against a bottom surface of said longitudinal groove when the connection device is inserted into the electrified guide;

wherein said at least one mechanical contact device is configured to be removed or moved before insertion of the device into the guide so that the connection device can be adapted to electrified guides having longitudinal grooves of different depth;

wherein said at least one mechanical contact device is shaped and/or located so that it abuts differently depending on the insertion of the connection device into the electrified guide to avoid improper insertion.

2. The connection device according to claim 1, wherein said at least one mechanical contact device is linked to a casing of the connection device.

3. The connection device according to claim 2, wherein said at least one mechanical contact device is configured to rotate around an axis (RR) that is fixed with respect to said casing before insertion of the device into the guide.

4. The connection device according to claim 2, wherein said at least one mechanical contact device is configured to shift along an axis (TT) that is fixed with respect to said casing before insertion of the device into the guide.

5. The connection device according to claim 1, wherein said at least one mechanical contact device is located at a central zone or an end zone of the connection device.

6. The connection device according to claim 1, comprising two mechanical contact devices, and wherein a first mechanical contact device is located at a first end zone of the connection device and a second mechanical contact device is located at a second end zone of the connection device.

7. The connection device according to claim 1, comprising an electronic circuitry configured to power-supply at least a lighting device.

8. The connection device according to claim 1, comprising a pin that is retractable and configured to abut against a bottom surface of said longitudinal groove, and in wherein a complete retraction of said pin allows the exit of at least one mechanical element from a side of a casing of the connection device.

9. The connection device according to claim 8, wherein the retraction of said pin is countered by a spring.

10. The connection device according to claim 1, comprising at least one mechanical element configured to exit at least partially from a side of a casing of the connection device.

11. The connection device according to claim 10, wherein said mechanical contact device and said mechanical element are integrated into a single mechanical piece.

12. The connection device according to claim 8, comprising a mobile command device, and wherein an actuation of said mobile command device causes the exit of said at least one mechanical element from a side of a casing of the connection device.

13. The connection device according to claim 12, wherein said command device comprises a slider and is located at an end and/or front zone of the connection device.

14. The connection device according to claim 13, wherein sliding of said slider causes the exit of electrical contacts at least from one side of a casing of the connection device.

15. A lighting device comprising a connection device according to claim 1.

* * * * *